United States Patent Office 3,777,002
Patented Dec. 4, 1973

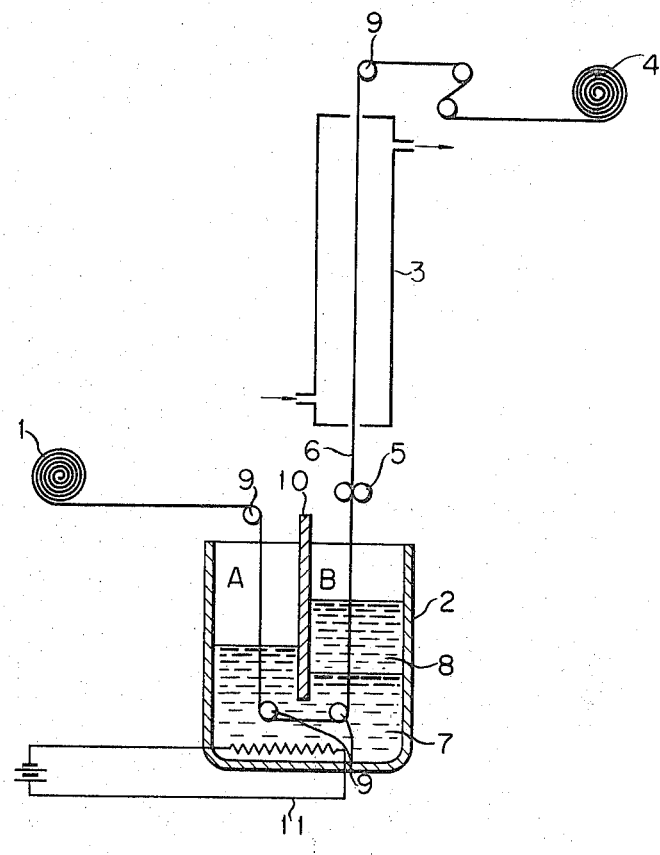

3,777,002
METHOD FOR MODIFYING THE SURFACE OF A POLYOLEFIN FILM
Toshio Suzuki, Koichi Awano, and Katsuhisa Ogino, Tokyo, Japan, assignors to Nisshin Boseki Kabushiki Kaisha, Tokyo, Japan
Filed Jan. 26, 1971, Ser. No. 109,884
Claims priority, application Japan, Feb. 2, 1970, 45/8,435
Int. Cl. B29c 25/00; B44d 5/02
U.S. Cl. 264—343                        3 Claims

ABSTRACT OF THE DISCLOSURE

This invention relates to a method for modifying the surface of a polyolefin film by heating said film in a thermal medium and then contacting said film with a treating liquid. The thermal medium is selected from various kinds of inert liquids which do not react with the polyolefin film and the treating liquid is selected from various kinds of organic compounds which may contain or do not contain a high molecular substance other than the polyolefin of the film.

FIELD OF INVENTION

This invention relates to a method for modifying the surface of a polyolefin film. It is well known in the art that polyolefins are very stable against chemicals and therefore that their surfaces are not roughened by the actions of solvents and oxidizing agents at the ambient temperatures. Also it is well known in the art that polyolefins do not contain a polar radical or group in their molecules and therefore that it is difficult to coat on their surfaces with an effective layer.

An object of this invention is to provide a method for roughening the surface of a polyolefin film in order to impart desirable properties such as adhesiveness, printing and writing adaptability on its surface.

A further object of this invention is to provide a method for coating the surface of a polyolefin film with a stable layer of a high molecular substance other than polyolefins.

Still a further object of this invention is to provide an apparatus for carrying out the methods in accordance with this invention.

BACKGROUND OF THE INVENTION

As mentioned above, polyolefins are not attacked by the actions of any solvents at the ambient temperatures but they are attached and become soluble by the actions of certain kinds of solvents at elevated temperatures. We, however, have found that the foregoing objects of this invention cannot be achieved when such a polyolefin film is treated with a solvent at an elevated temperature because the conventional practices are confronted with some difficulties such an elevated temperature. The first difficulty is that such a polyolefin film is softened and swelled when it is treated with a solvent at an elevated temperature as applicable to this invention and the polyolefin film cannot retain its original state and particularly, a mono-axially or a bi-axially, molecular-orientated polyolefin film is remarkably shrunk in width. Another difficulty is that such a polyolefin film tends to get damaged or lost when it is continously treated with a solvent at an elevated temperature because the treatment causes said film to soften and swell and subject to destruction by the conveying rollers. Such a problem can be removed when both ends of said film are supported by means of suitable devices but this is expensive.

THE INVENTION

In order to remove the foregoing difficulties, this invention provides a method for roughening the surface of a polyolefin film by treating said film with a solvent under heating conditions or a method for coating the surface of such a polyolefin film with a solvent containing a high molecular substance, which is different from polyolefins, by treating said film under heating.

In accordance with this invention, a polyolefin film to be treated is heated at a temperature of 60° C. to 140° C. in an inert liquid (referred to as a thermal medium hereinafter) and then the film is contacted with a liquid material (referred to as a treating liquid hereinafter) having the ability to swell or dissolve said film at a temperature equal to or below the temperature of a thermal medium and finally the film thus treated is dried by evaporating and removing the treating liquid by heating it in the presence of a hot air stream in order to complete the modification of the surface of the film.

DETAILED DESCRIPTION

For carrying out an embodiment of this invention, we have found that an apparatus as shown in the accompanying drawing is suitable for obtaining an effective heating of a polyolefin film and removing the problems such as damage of the film's surface when it is treated in the treating liquid.

Referring to the accompanying drawing, it shows a roll 1 on which a polyolefin film is wound. The film is fed into the apparatus and passed through it by means of guide rolls 9 and wounded on a reel roll 4. A treating vessel 2 is divided into a chamber A and a chamber B by means of a central partition plate 10. An opening part is formed between the lower end of the plate 10 and the bottom of the apparatus and the film can be passed through the opening part. A thermal medium 7 is charged into the treating vessel 2 in an amount sufficient to block the opening part. A treating liquid 8 is charged into the treating vessel so that said treating liquid does not enter the chamber A due to the central partition 10 and the thermal medium 7. Nip rolls 5 are used for removing an excess of the treating liquid from the surface of the film, and a dried 3 is used for evaporating and removing the treating liquid adhered to the film. The thermal medium 7 is heated to a desirable temperature by means of a heating device 11 or other suitable devices disposed at the bottom of the treating vessel 2.

The thermal medium used in this invention must satisfy requirements such as that it does not react with the polyolefin film and the treating liquid but the thermal medium is compatible and immiscible with the treating liquid, it has the thermal stability sufficient to achieve the objects of this invention and it has a higher specific gravity than that of the treating liquid. Some examples of such a thermal medium include mercury and a low melting metal such as Wood's metal and Brannt's metal, and saturated solutions of inorganic compounds such as iron chlorides, calcium chloride, lithium chloride, sodium hydroxide and potassium hydroxide, and sulfuric acid.

Any one of the treating liquids having the ability to swell and dissolve the polyolefin films can be used in this invention and some examples are benzene, toluene, xylene, decahydronaphthalene, cyclohexanone, mono- and di-chlorobenzene, nitro-benzene, trichloroethylene, trichloroethane, tetrachloroethylene, tetrachloroethane, 1,3-dichloropropane, 1,3-dichlorobutane and trans-1,3-dichloropropylene, and mixtures thereof. Also, it is possible to use such a treating liquid in combination with other solvents for controlling the actions of the treating liquids or increasing the ability for dissolving the high molecular treating substances.

The polyolefin films used in this invention are those which are stretched and molecular-oriented in one axial direction or two axial directions but it should be understood that non-stretched and non-orientated polyolefin films can be used in accordance with this invention. Such a film can be heated in the thermal medium to a temperature at which temperature the film is deformed if desired because the thermal medium does not react with the film. Then, the heated film is contacted with the treating liquid immediately after said film is removed from the thermal medium because the treating liquid is in contact with the thermal medium. The treating liquid is heated, by the heat transferred by the thermal medium or supplied from a separate heat source, to a temperature equal to or below the temperature of the thermal medium but it is noted that the treating liquid can be used at the ambient temperatures. The reasons why such a lower temperature of the treating liquid can be used are that the temperature of the treating liquid in contact with the film is elevated due to the fact that the thermal medium is fully heated at a high temperature, the heat content of the film entering the treating liquid or it is considered that there is formed a high temperature thin layer of the treating liquid between the thermal medium and the treating liquid.

As obvious from the accompanying drawing, it is possible to feed the film by not contacting it with any members of the apparatus and if desired it is also possible to pass the film from the thrmal medium to the drier by not contacting said film with any members of the apparatus in accordance of this invention.

When the treating liquid is a solvent not containing the high molecular substance, the resultant film is semitransparent or opaque and it is roughened on its surface. When the treating liquid is a solvent containing the high molecular substance, the resultant film is semitransparent or transparent and the film is converted with a stable layer depending on the nature or the concentration of the high molecular substances.

Some examples of the high molecular substances are polystyrene, polyvinyl chloride, nylon, polycarbonate and the like. Also, it is possible to use high or low density polyethylene when an isotactic polyproplene film is treated. It is also possible to use low density polyethylene when a high density polyethylene film is treated. The concentration of the high molecular substances in the treating liquid can be varied depending on the thickness of the layer to be coated on the film. It is preferable to use the treating liquid containing the high molecular substance in an amount of below 10% by weight. When the treating liquid contains the high molecular substance in an amount of above 10% by weight, the operation becomes difficult due to the increase of viscosity of the treating liquid.

The temperature of the thermal medium can be varied depending on the nature of the films to be treated and it is preferable to use a temperature within the range of 60° C. to 80° C. when the low density polyethylene film is treated and also it is preferable to use a temperature within the range of 105° C. to 140° C. when the isotactic polypropylene film is treated. Also it is noted that a temperature ranging frm 60° C. to 110° C. is preferably used when the high density polyethylene film is treated.

The temperature of the treating liquid can be varied to a temperature ranging from the temperature of the thermal medium to the ambient temperatures but it is preferable to use a temperature near the thermal medium when a strong effect is desired. Of course, the temperature can be controlled by the heat supplied by an outside heat source but the treating liquid can be heated by only the heat transferred from the thermal medium.

The resident time required for the film which is passed through the thermal medium can be varied depending on the temperature required for the film and such a resident time is not critical in this invention. Also, the resident time required for the film which is passed through the treatng liquid can be varied in the range of fractions of a second to several tens of seconds depending on the intended purpose.

It is preferable to use a nip roller, knife-doctor, air knife-doctor and the like for removing any excess of the treating liquid containing the high molecular substance from the surface of the film after it was passed through such a treating liquid. Also, the film thus treated is preferably dried in a drier using hot air for evaporating and removing residual treating liquid adhered to the film and of course the hot air must be controlled to a temperature at which the film is not deformed.

In accordance with this invention, it is possible to use the treating liquid at a relatively low temperature and also to minimize the contact period of time between the treating liquid and the film for minimizing the deformation of the film.

The polyolefin films which are roughened on their surfaces by treating them with the treating liquid not containing the high molecular substance can be used as printing paper and packing paper. Also they can be covered with various kinds of coatings and adhered to other materials depending on the effects of their surface roughness. Also, the polyolefin films which are roughened on their surfaces by treating them with the treating liquid containing the high molecular substance have formed on their surfaces a thin layer having high chemical activity, adhesiveness and high susceptibility to solvent attack, and therefore they are easy to print on or adhere with other materials or to coat on with various kinds of coating materials or to use as packing or gasketing materials.

This invention is illustrated by the following examples.

EXAMPLE 1

A film produced by stretching and molecular-orientating an isotactic polypropylene in biaxial directions to have $70\mu$ in thickness was continuously passed through the treating vessel as shown in the accompanying drawing. In the treating vessel, mercury was used as the thermal medium and tetrachloroethylene was used in the second chamber B as the treating liquid. The thermal medium was kept at about 115° C. by heating it with an electric-heating device inserted at the bottom of the treating vessel and the treating liquid was kept at an average temperature of 106° C. The film was passed through the thermal medium at a resident time of about two seconds and also it was passed through the treating liquid at a resident time of about one second, and then the treated film was dried in a hot air to produce a white and semitransparent polypropylene film, the surface of which was roughened uniformly. The resultant film was compared with an untreated film and it was found that the resultant film had shrunk in width by less than 3% of the original width. Also it was found that the resultant film was easy to write on with a pencil or a pen and also that it was easy to print on by gravure or offset printing.

EXAMPLE 2

Example 1 was repeated with the exception that tetrachloroethylene containing 2% by weight of dissolved polystyrene was used as the treating liquid. It was found that the resultant film was transparent and covered with a polystyrene layer about $10\mu$ thick. The resultant film was compared with an untreated film and it was found that the resultant film is shrunk in width by less than 1% of the original width. Also, it was found that the resultant film was easy to coat with a coating solution comprising a binder such as a styrene-butadiene latex and a filler such as kaolin and also that the surface of the resultant film had mechanical strength sufficient for offset printing.

EXAMPLE 3

A film $80\mu$ thick produced from unstretched high density polyethylene was continuously passed through the treating apparatus as shown in the accompanying drawing. Mercury was used as the thermal medium and trichloroethylene was used as the treating liquid in the second chamber B. The thermal medium was kept at 105° C. and the treating liquid was kept at 85° C. The film was passed through the thermal medium at a resident time of about three seconds and also it was passed through the treating liquid at a resident time of about two seconds, and then the treated film was dried in a hot air to produce a white and opaque high density polyethylene film, the surface of which was roughened. The resultant film was compared with an untreated film and it was found that the resultant film had shrunk in width by less than 1% of the original width and also that it was 110μ thick. Also, it was found that the resultant film was easy to print on by offset printing.

EXAMPLE 4

Example 2 was repeated with the exception that trichloroethylene containing 3% by weight of dissolved polyvinyl chloride was used as the treating liquid. It was found that the resultant film was semitransparent was covered with a polyvinyl chloride layer about 15μ thick. The resultant film was compared with an untreated film and it had found that the resultant film was shrunk in width by less than 1% of the original width. Still further, it was found that the resultant film was easy to coat with a coating solution comprising a binder such as a vinyl acetate latex and a filler such as calcium carbonate. The surface of the resultant film had mechanical strength sufficient for offset printing.

EXAMPLE 5

A film produced by stretching an isotactic polypropylene in biaxial directions to have 50μ thickness was continuously passed through the treating apparatus as shown in the accompanying drawing. Wood's metal was used as the thermal medium and tetrachloroethane containing 1% by weight of dissolved polystyrene was used as the treating liquid. The thermal medium was kept at 130° C. by heating with an induction heat source and the treating liquid was kept at 110° C. The film was passed through the thermal medium at a resident time of about two seconds and through the treating liquid at a resident time of about three seconds. The excess of the treating liquid was removed from the surface of the film by using an air-knife, and then the treated film was dried by hot air at 100° C. to produce a semitransparent film covered with a polystyrene layer of about 5μ in thickness. It was found that the resultant film was easy to coat with a coating solution comprising a binder of a styrene-butadiene latex and a filler of clay, and also that the surface of the resultant film had mechanical strength sufficient for offset printing.

EXAMPLE 6

A film produced from low density polyethylene without stretching of 60μ thickness was continuously passed through the treating apparatus as shown in the accompanying drawing. A solution saturated with ferric chloride was used as the thermal medium and ethylene chloride was used as the treating liquid. The thermal medium was heated at 70° C. and the treating liquid which is charged in the second chamber B was heated at 50° C. The film was passed through the thermal medium at a resident time of about two seconds and also it was through the treating liquid at a resident time of about 0.5 second, and then the treated film was dried in a hot air at 60° C. to produce a white and opaque low density polyethylene film, the surface of which was roughened and spongy-like. The resultant film was compared with an untreated film and it was found that the resultant film was shrunk in width by less than 0.5% of the original width and was 85μ thick. Also it was found that the resultant film was easy to print on by offset, gravure or relief printing.

What we claim is:

1. A method for continuously modifying the surface of a polyolefin film which comprises the steps of:
    (a) heating said film by passage through a thermal medium, said thermal medium being a liquid inert with respect to said film;
    (b) directly contacting said film with a treating liquid by directly passing said film through the interface between said thermal medium and said treating liquid, said treating liquid having a specific gravity less than that of said thermal medium and being inert and immiscible with respect to said thermal medium and positioned atop said thermal medium, said treating liquid having the ability to modify and thereby soften at least the surface of said polyolefin film at elevated temperature, and to buoyantly support said heated and softening film during passage through said treating liquid.

2. The treating method according to claim 1 wherein said treating liquid includes a high molecular weight substance other than the polyolefin of the film dissolved in an amount not exceeding 10% by weight in said treating liquid.

3. A method according to claim 1 wherein said thermal medium is maintained at a controlled temperature in the range 60° C. to 140° C.

References Cited
UNITED STATES PATENTS

| | | | |
|---|---|---|---|
| 3,397,079 | 8/1968 | De Pugh et al. | 117—47 A |
| 3,556,956 | 1/1971 | Miller | 117—47 A |
| 3,597,257 | 8/1971 | Dunn, Jr. | 117—47 A |
| 3,660,141 | 5/1972 | Yoshiyasu et al. | 117—138.8 E |
| 3,489,601 | 1/1970 | Stapp et al. | 117—138.8 E |
| 2,429,861 | 10/1947 | Woodbridge | 117—138.8 E |
| 3,086,275 | 4/1963 | Pritchard | 117—138.8 E |

ROBERT F. WHITE, Primary Examiner

G. AUVILLE, Assistant Examiner

U.S. Cl. X.R.

117—47 H, 138.8 E; 264—129